(12) United States Patent
Hudson et al.

(10) Patent No.: US 11,085,272 B2
(45) Date of Patent: Aug. 10, 2021

(54) POWERING DOWNHOLE DEVICES

(71) Applicant: METROL TECHNOLOGY LTD, Aberdeen (GB)

(72) Inventors: Steven Martin Hudson, Aberdeen (GB); Leslie David Jarvis, Aberdeen (GB)

(73) Assignee: METROL TECHNOLOGY LTD., Aberdeenshire (GB)

( * ) Notice: Subject to any disclaimer, the term of this patent is extended or adjusted under 35 U.S.C. 154(b) by 0 days.

(21) Appl. No.: 16/498,657

(22) PCT Filed: Mar. 28, 2018

(86) PCT No.: PCT/GB2018/050841
§ 371 (c)(1),
(2) Date: Sep. 27, 2019

(87) PCT Pub. No.: WO2018/178688
PCT Pub. Date: Oct. 4, 2018

(65) Prior Publication Data
US 2020/0032622 A1    Jan. 30, 2020

(30) Foreign Application Priority Data

Mar. 31, 2017 (WO) ............... PCT/GB2017/050912

(51) Int. Cl.
*E21B 41/00* (2006.01)
*E21B 17/00* (2006.01)
(Continued)

(52) U.S. Cl.
CPC ........ *E21B 41/0085* (2013.01); *E21B 17/003* (2013.01); *E21B 17/028* (2013.01);
(Continued)

(58) Field of Classification Search
CPC .... E21B 47/00; E21B 17/1078; E21B 17/003; E21B 17/028; E21B 17/0283; E21B 33/13; E21B 33/134; E21B 41/0085
See application file for complete search history.

(56) References Cited

U.S. PATENT DOCUMENTS

| 5,394,141 A | 2/1995 | Soulier |
| 6,515,592 B1 * | 2/2003 | Babour ................... E21B 47/13 340/854.4 |

(Continued)

FOREIGN PATENT DOCUMENTS

| CN | 105370210 A | * | 3/2016 |
| CN | 108278097 A | * | 7/2018 |

(Continued)

OTHER PUBLICATIONS

International Search Report and Written Opinion of the ISA for PCT/GB2018/050841 dated Jun. 6, 2018, 12 pages.

*Primary Examiner* — Jennifer H Gay
(74) *Attorney, Agent, or Firm* — Nixon & Vanderhye, P.C.

(57) ABSTRACT

A downhole power delivery system for use in a well comprising downhole metallic pipe (2) running in a borehole of the well with a downhole sealing plug (31) provided in a bore or annulus at least partly defined by the downhole metallic pipe. The power delivery system comprising below plug apparatus (5) located in the borehole below the plug (31) including a downhole device (53) requiring electrical power and downhole power supply apparatus (6) located in the borehole above the plug (31). The power supply apparatus (6) comprises at least one battery (64) for powering the downhole device and the downhole power supply apparatus (6) and below plug apparatus (5) being arranged for delivering electrical power from the downhole power supply (Continued)

Figure 1:
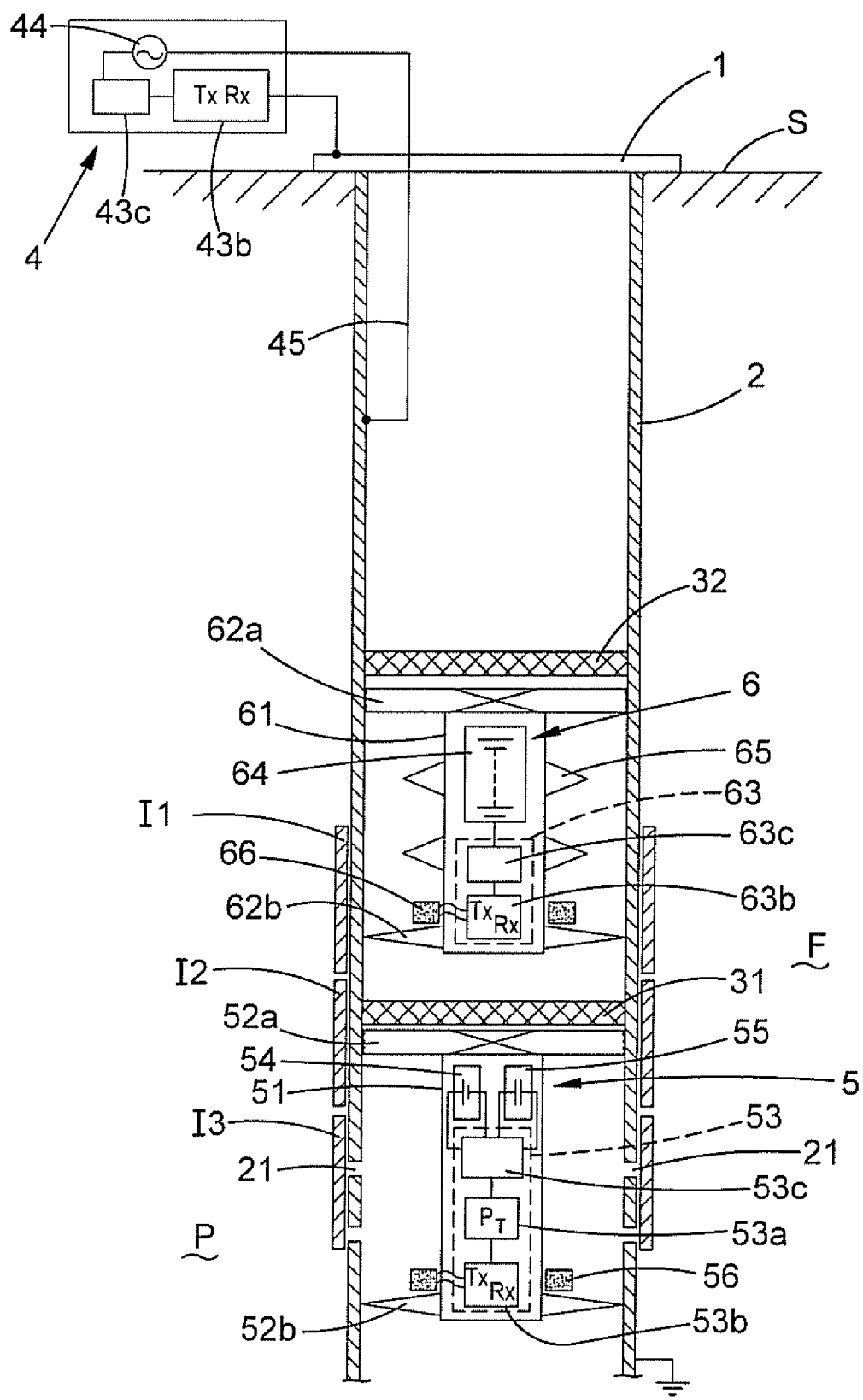

apparatus (6) to the downhole device (53) across the downhole sealing plug (31).

31 Claims, 4 Drawing Sheets

(51) Int. Cl.

| | | |
|---|---|---|
| *E21B 17/10* | (2006.01) | |
| *E21B 47/00* | (2012.01) | |
| *E21B 33/134* | (2006.01) | |
| *E21B 17/02* | (2006.01) | |
| *E21B 36/04* | (2006.01) | |
| *E21B 33/13* | (2006.01) | |
| *H04B 7/155* | (2006.01) | |
| *E21B 47/13* | (2012.01) | |

(52) U.S. Cl.
CPC .......... *E21B 17/1078* (2013.01); *E21B 33/13* (2013.01); *E21B 36/04* (2013.01); *E21B 47/00* (2013.01); *E21B 47/13* (2020.05); *H04B 7/155* (2013.01); *E21B 33/134* (2013.01)

(56) References Cited

U.S. PATENT DOCUMENTS

| | | | |
|---|---|---|---|
| 7,140,434 B2 * | 11/2006 | Chouzenoux | E21B 49/008 166/250.11 |
| 7,322,410 B2 * | 1/2008 | Vinegar | E21B 33/1294 166/250.15 |
| 8,164,475 B2 * | 4/2012 | Hudson | E21B 47/13 340/854.4 |
| 9,366,092 B2 * | 6/2016 | Hutin | E21B 47/12 |
| 9,546,539 B2 * | 1/2017 | Hudson | E21B 41/0085 |
| 10,100,634 B2 * | 10/2018 | Ganguly | E21B 47/13 |
| 10,459,107 B2 * | 10/2019 | Pelletier | G01V 1/22 |
| 10,655,456 B2 * | 5/2020 | Espe | E21B 47/07 |
| 2001/0035288 A1 * | 11/2001 | Brockman | E21B 41/0035 166/65.1 |
| 2002/0114216 A1 * | 8/2002 | Veneruso | E21B 17/028 367/83 |
| 2003/0042016 A1 | 3/2003 | Vinegar et al. | |
| 2003/0042026 A1 * | 3/2003 | Vinegar | E21B 43/12 166/369 |
| 2004/0079524 A1 * | 4/2004 | Bass | E21B 33/1294 166/65.1 |
| 2007/0295504 A1 * | 12/2007 | Patel | E21B 43/14 166/263 |
| 2008/0007422 A1 * | 1/2008 | Hudson | E21B 47/13 340/854.4 |
| 2008/0041576 A1 * | 2/2008 | Patel | E21B 47/00 166/65.1 |
| 2008/0110644 A1 * | 5/2008 | Howell | E21B 17/028 166/387 |
| 2010/0116550 A1 * | 5/2010 | Hutin | E21B 17/003 175/40 |
| 2011/0148656 A1 * | 6/2011 | Hudson | E21B 41/0085 340/854.3 |
| 2011/0232917 A1 * | 9/2011 | Skinner | E21B 47/13 166/373 |
| 2012/0067567 A1 * | 3/2012 | Rytlewski | E21B 47/12 166/250.01 |
| 2013/0032403 A1 * | 2/2013 | Rozenblit | E21B 47/12 175/40 |
| 2013/0120093 A1 * | 5/2013 | Deville | E21B 17/023 336/115 |
| 2013/0299165 A1 * | 11/2013 | Crow | E21B 33/12 166/250.08 |
| 2013/0321165 A1 | 12/2013 | Johannessen | |
| 2014/0218208 A1 | 8/2014 | Hudson | |
| 2014/0329301 A1 | 11/2014 | Handique | |
| 2015/0354351 A1 | 12/2015 | Morrow et al. | |
| 2016/0115782 A1 * | 4/2016 | Martinez | E21B 47/12 340/853.3 |
| 2016/0341030 A1 | 11/2016 | Mulholland et al. | |
| 2017/0081956 A1 * | 3/2017 | Ganguly | E21B 47/13 |
| 2017/0145777 A1 * | 5/2017 | Vasques | E21B 41/0035 |
| 2017/0299758 A1 * | 10/2017 | Pelletier | E21B 47/113 |
| 2017/0335678 A1 * | 11/2017 | Ciezobka | E21B 33/12 |
| 2018/0094519 A1 | 4/2018 | Stephens et al. | |
| 2018/0179886 A1 * | 6/2018 | Espe | E21B 47/002 |
| 2018/0274356 A1 * | 9/2018 | Hazel | E21B 47/07 |
| 2019/0323322 A1 * | 10/2019 | Ross | E21B 17/003 |
| 2019/0353011 A1 * | 11/2019 | Ross | H02M 3/33523 |
| 2019/0353030 A1 * | 11/2019 | Jarvis | E21B 47/06 |
| 2020/0032621 A1 * | 1/2020 | Hudson | E21B 41/0085 |
| 2020/0032622 A1 * | 1/2020 | Hudson | E21B 17/028 |
| 2020/0080415 A1 * | 3/2020 | Behjat | E21B 33/14 |
| 2020/0102820 A1 * | 4/2020 | Hudson | E21B 47/13 |
| 2020/0208473 A1 * | 7/2020 | Biddick | E21B 43/128 |
| 2020/0340305 A1 * | 10/2020 | Odegbami | E21B 17/028 |

FOREIGN PATENT DOCUMENTS

| | | | | |
|---|---|---|---|---|
| EP | 0 314 654 | | 5/1989 | |
| EP | 0 314 654 A1 | | 5/1989 | |
| GB | 2461282 A | * | 12/2009 | ......... E21B 41/0085 |
| NO | 20151746 | | 12/2015 | |
| WO | WO 99/60250 | | 11/1999 | |
| WO | WO-2004111389 A1 | * | 12/2004 | ............... H02J 3/36 |
| WO | WO-2005024177 A1 | * | 3/2005 | ............ E21B 47/14 |
| WO | WO-2007016687 A1 | * | 2/2007 | ......... E21B 17/003 |
| WO | WO 2010/083210 A1 | | 7/2010 | |
| WO | 2016/076875 | | 5/2016 | |
| WO | WO-2016076875 A1 | * | 5/2016 | ............... G01V 1/22 |
| WO | WO-2018122544 A1 | * | 7/2018 | ............ E21B 41/02 |
| WO | WO-2018122547 A1 | * | 7/2018 | ......... E21B 41/0085 |
| WO | WO-2018147745 A1 | * | 8/2018 | ......... E21B 33/1204 |

* cited by examiner

POWERING DOWNHOLE DEVICES

This application is the U.S. national phase of International Application No. PCT/GB2018/050841 filed Mar. 28, 2018 which designated the U.S. and claims priority to GB Patent Application No. PCT/GB2017/050912 filed Mar. 31, 2017, the entire contents of each of which are hereby incorporated by reference.

This invention relates to methods and systems for powering downhole devices, for example, for monitoring abandoned well installations. In particular it relates to systems and methods for use in wells including at least one run of downhole metallic pipe and at least one sealing plug in a bore or annulus at least partly defined by the metallic pipe. In one particular example it relates to abandoned wells where the borehole is lined with metallic liner and plugged with at least one downhole sealing plug within the liner.

Typically in such a case the or each plug comprises cement and may also comprise a secondary plug element. In principle different sealing materials besides cement may be used to form a plug—these might be other materials which solidify or set, or even say, a gel-like material. In other cases a different, say more mechanical, type of sealing plug may be used. The or each plug is put in place at a downhole location to act as a seal. The secondary plug element may be metallic and may be used in installation of the plug and/or for acting as part of the seal and/or for performing other functions. Typically, below the lowermost plug the well will be exposed to the formation and thus will tend to fill with product, that is, oil and/or gas. Typically there is a significant temperature gradient across any plug. The gradient will depend on the depth within the well at which the plug is located. Further, below at least a lowermost plug, temperatures will typically be relatively high, say 150° C. or 200° C.

As is well understood it is desirable to be able to monitor the conditions in the formation and hence the associated product reservoir in an oil field. Monitoring may be in specific monitoring wells, production wells, appraisal wells or whilst drilling or so on—such monitoring may take place at any or all stages in the life cycle of a well.

A field often includes one or more abandoned well for various reasons. For example, sometimes an abandoned well will be an initial appraisal well which has been drilled specifically with the purpose of monitoring the conditions in the formation over an initial period. In other circumstances an abandoned well may be a well that at one stage was a producing well but which has been temporarily or permanently abandoned. It would be desirable to be able to make use of such wells to enable monitoring of the conditions in the formation at the location of such a well. Most typically it will be desired to take pressure and/or temperature measurements in the region of the well. Sometimes it may also be desirable to take measurements at a location between two adjacent plugs within a well where the well includes two or more plugs.

Issues arise as to how pressure and temperature measurements are to be retrieved to the surface for analysis. Because of the nature of an abandoned well, where the cement plug is a vitally important seal, it is highly undesirable to put a cable through the plug. Thus for transmitting pressure and temperature readings from this downhole region to the surface, it is desirable that wireless transmission techniques are used—for example electromagnetic or acoustic signalling techniques may be used. Such transmission techniques are well established and tools are available for taking pressure and temperature measurements and transmitting such signals to the surface. However a particular problem arises when it comes to providing power for these measurements and, in particular, transmissions. Whilst other sources of power have been proposed, in reality the use of batteries to provide the power is the most common realistic and practical choice. However the high temperature which exists in such a region (i.e. of say 150° C. to 200° C.) has a very negative impact on the lifetime of batteries. The type of batteries that need to be used to provide sufficient power for making these type of transmissions have a limited lifetime at these high temperatures. That is to say, whether or not the energy in the batteries is used, it will dissipate due to the high temperatures. Therefore if batteries are used in such a location the signalling tool will only be able to send signals to the surface for a limited period before the power in the batteries has dissipated.

Similarly there can be other situations where it is desired to provide power to a downhole device which is located downhole below a sealing plug provided in a bore or annulus. Again in such cases providing power by cable to such devices can be difficult/expensive and highly undesirable.

Thus it would be desirable to provide an alternative source of power for making such measurements and transmissions and powering such devices in general.

According to one aspect of the invention there is provided a downhole power delivery method for use in a well comprising downhole metallic pipe running in a borehole of the well with a downhole sealing plug provided in a bore or annulus at least partly defined by the downhole metallic pipe, the method comprising:

positioning below plug apparatus, including a downhole device requiring electrical power, in the borehole below the plug;

positioning downhole power supply apparatus in the borehole above the plug, the power supply apparatus comprising at least one battery for powering the downhole device; and delivering electrical power from the downhole power supply apparatus to the downhole device across the downhole sealing plug.

The step of delivering electrical power from the downhole power supply apparatus to the downhole device may comprise:

using the power supply apparatus to apply electrical current to the downhole metallic pipe above the plug; and using the below plug apparatus to pick up electrical current from the downhole metallic pipe below the plug to power the downhole device.

According to another aspect of the invention there is provided a downhole power delivery system for use in a well comprising downhole metallic pipe running in a borehole of the well with a downhole sealing plug provided in a bore or annulus at least partly defined by the downhole metallic pipe, the power delivery system comprising:

below plug apparatus located in the borehole below the plug including a downhole device requiring electrical power; and downhole power supply apparatus located in the borehole above the plug, the power supply apparatus comprising at least one battery for powering the downhole device, the downhole power supply apparatus and below plug apparatus being arranged for delivering electrical power from the downhole power supply apparatus to the downhole device across the downhole sealing plug.

The power supply apparatus may comprise a power transfer arrangement for applying electrical current to the downhole metallic pipe above the plug; and the below plug apparatus may comprise a power pick up arrangement for picking up electrical current from the downhole metallic pipe below the plug to power the downhole device.

The below plug apparatus may be downhole sensing apparatus for sensing a parameter in the well below the plug. In such a case the downhole device requiring power will be part of the sensing apparatus.

The sealing plug may be entirely within the downhole metallic pipe or may extend through at least one gap in the downhole metallic pipe to the surroundings. Thus in some cases the plug may seal against a formation surrounding a borehole in which the downhole metallic pipe is located. There may be an axial spacing between two lengths of downhole metallic pipe in the region of the plug such that there is an uncased length of borehole in which the material of the plug seals against the formation in which the borehole is drilled.

In some embodiments a break is provided in the downhole metallic pipe on at least one side of the axial spacing so forming a metallic pipe section which is not galvanically connected to the remainder of the downhole metallic pipe on the respective side of the axial spacing and a respective one of the power transfer arrangement and power pick up arrangement comprises said metallic pipe section as an electrode for applying signals to the formation and/or picking up electrical signals from the formation.

Preferably a respective break is provided in the downhole metallic pipe on each side of the axial spacing.

The break may be an auxiliary axial spacing ie another uncased section, or may comprise an insulation joint. The insulation joint may for example comprise a gap sub and/or a joint with an insulation coat over the thread. Cement or another sealing material might be provided in the break.

Insulation may be provided between downhole metallic pipe and the formation in a region on the side of the break which leads away from the axial spacing.

The downhole metallic pipe may be casing.

In another aspect of the invention there may be an abandoned well monitoring method or system comprising a downhole power delivery method or system as defined above. The downhole metallic pipe may be liner and the downhole sealing plug may be provided within the liner.

According to a further aspect of the invention there is provided an abandoned well monitoring method for monitoring an abandoned well installation which comprises a borehole lined with metallic liner and plugged with a downhole sealing plug within the liner, the method comprising:

positioning downhole sensing apparatus in the borehole below the plug for sensing a parameter in the well below the plug;

positioning downhole power supply apparatus in the borehole above the plug, the power supply apparatus comprising at least one battery for powering the downhole sensing apparatus;

using the power supply apparatus to apply electrical current to the liner above the plug; and using the downhole sensing apparatus to pick up electrical current from the liner below the plug to power the downhole sensing apparatus.

According to another aspect of the invention there is provided an abandoned well monitoring system for monitoring an abandoned well installation which comprises a borehole lined with metallic liner and plugged with a downhole sealing plug within the liner, the monitoring system comprising:

downhole sensing apparatus located in the borehole below the plug for sensing a parameter in the well below the plug; and downhole power supply apparatus located in the borehole above the plug, the power supply apparatus comprising at least one battery for powering the downhole sensing apparatus, wherein the power supply apparatus comprises a power transfer arrangement for applying electrical current to the liner above the plug; and the downhole sensing apparatus comprises a power pick up arrangement for picking up electrical current from the liner below the plug to power the downhole sensing apparatus.

Such arrangements can allow the provision of batteries in a lower temperature zone above the plug so as to provide an increased lifetime compared to if the batteries are located below the plug. This additional lifetime can outweigh the losses which are incurred by transmitting power from the power supply apparatus above the plug to the sensing apparatus below the plug.

Where there are multiple plugs in a well installation the plug mentioned above will most likely be the lowermost plug.

The below plug apparatus, for example the downhole sensing apparatus, and the downhole power supply apparatus may be disposed adjacent to, whilst on opposite sides of, the sealing plug.

The abandoned well monitoring system/the downhole power delivery system may comprise at least one alternative source of power which is separate from the at least one battery of the power supply apparatus.

The abandoned well monitoring system/downhole power delivery system may comprise control means for controlling which source of power is used by the below plug apparatus.

The below plug apparatus may comprise at least one local battery. This local battery will thus be located below the plug.

The local battery may be used preferentially when available. Thus for example when the below plug apparatus is first installed the local battery may be used. At this time a higher frequency of readings is likely to be desirable and relatively high levels of power and energy can be supplied by the local battery over an initial period before the long term discharging effects of high temperature take over. At later times the energy from the battery of the power supply apparatus can be used.

The battery of the power supply apparatus may be arranged to have a higher maximum output voltage than that of the local battery.

The control means may be arranged for controlling when the below plug apparatus uses power from the local battery and when the below plug apparatus uses power from the power supply apparatus. This may be in dependence, say, on the charge level of the local battery and/or the level of electrical power delivered therefrom.

The below plug apparatus may comprise the control means.

Alternatively the control means may be remote from the below plug apparatus. The system may be arranged for transmitting control signals from the control means to the below plug apparatus.

The control means may be distributed.

The below plug apparatus may be arranged under control of the control means to operate using the local battery whilst this has charge and switch to use power from the power supply apparatus when the local battery does not have charge.

The control means may be arranged to determine whether the local battery has at least a threshold level of charge, and cause use of the local battery when its charge is at least at this threshold level. The control means may be arranged to cause use of power from the power supply apparatus when the local battery has a level of charge below the threshold level.

The control means may be arranged to cause the below plug apparatus to use power from the local battery for a predetermined period after a start time.

The control means may be arranged to cause the below plug apparatus to use power from the power supply apparatus after said predetermined period.

The start time may be set at manufacture, installation or during operation/post installation.

When power is to be supplied from the power supply apparatus, the control means may output a control signal for causing transmission of power by the power supply apparatus.

The below plug apparatus may comprise charge storage means for storing power delivered by the power supply apparatus. The charge storage means may comprise at least one battery, which may comprise the local battery, or be separate therefrom.

The system may comprise a surface power supply for supplying power to the below plug apparatus by applying electrical current to the downhole metallic pipe above the plug for pick up by the power pick up arrangement.

The surface power supply may be connected to the downhole metallic pipe at the surface. Alternatively, the system may comprise a cable running down the well to a downhole location at which electrical current from the cable is applied to the downhole metallic pipe. There may, for example, be a direct connection between the cable and the downhole metallic pipe at this location.

Preferably the system comprises a second power transfer arrangement arranged for transferring power from the cable to the downhole metallic pipe.

Alternatively, in some embodiments, the cable may be connected to the downhole power supply apparatus.

The well installation may comprise a second downhole sealing plug within the downhole metallic pipe at a location above that of the downhole power supply apparatus, such that the downhole power supply apparatus is disposed between the two sealing plugs.

In such a case, the cable may be arranged to apply electrical current to the downhole metallic pipe at a location above the second plug.

As a result electrical power from the surface unit may progress down into the well past the second plug and optionally also past the first plug by virtue of the electrical current running within the downhole metallic pipe.

Power delivered from the surface in this way will tend to suffer from high loses.

Thus power from the power supply apparatus and (where present) the local battery may be used in preference thereto.

The control means may be arranged for controlling when the below plug apparatus uses power from the surface power supply and when the below plug apparatus uses power from the downhole power supply apparatus. This may be in dependence, say, on the charge level of the battery in the power supply apparatus and/or the level of electrical power delivered therefrom.

The control means may be arranged for controlling when the below plug apparatus uses power from the surface power supply, when the below plug apparatus uses power from the local battery, and when the below plug apparatus uses power from the downhole power supply apparatus.

The control means may be arranged to cause the below plug apparatus to use power from surface power supply after a predetermined period of using power from the downhole power supply apparatus.

The control means may be arranged to cause the below plug apparatus to use power from the local battery for a first predetermined period after a start time.

The control means may be arranged to cause the below plug apparatus to use power from the downhole power supply apparatus after said first predetermined period and for a second predetermined period and to use power from the surface power supply after said second predetermined period.

The control means may be arranged to determine when the charge level in the at least one battery in the downhole power supply apparatus falls below a threshold and to cause the below plug apparatus to use power from the surface power supply when the charge level falls below the threshold.

The below plug apparatus may comprise downhole communication apparatus for communication with the power supply apparatus and/or a surface communication apparatus.

The downhole communication apparatus may be used for transmitting parameter readings towards the surface.

The downhole communication apparatus may be used for receiving control instructions. Such instructions may comprise one or more of: instructions to take a parameter reading, instructions to transmit a parameter reading, and instructions indicating which source of power is to be used.

The below plug apparatus may comprise a downhole tool. The tool may comprise one or more of: at least one sensor, a control unit for controlling operation of the downhole tool, the downhole communication apparatus, the power pick up arrangement, and the at least one local battery. The downhole tool may be a downhole sensing tool.

In some implementations the control means may comprise the control unit. In some other implementations the control unit may comprise the control means.

The below plug apparatus may comprise a spaced pair of contacts for making electrical contact with the downhole metallic pipe.

At least one of the contacts may comprise a conductive centraliser for making electrical contact with the downhole metallic pipe.

At least one of the contacts may comprise a plurality of high force spring centraliser units.

At least one of the contacts may be arranged to bite into the material of the downhole metallic pipe for enhancing electrical connection. At least one of the contacts may comprise teeth.

At least one of the contacts may be arranged as a setting means for gripping into the material of the downhole metallic pipe for holding the apparatus in position.

One of the contacts may be part of the plug. That is the plug may comprise a contact such as a conductive centraliser—the contact/conductive centraliser may be a secondary plug element.

The below plug apparatus may comprise a conductive member provided between the spaced pair of contacts such that a proportion of current flowing in the downhole metallic pipe will flow through the conductive member. A toroidal inductive coupling may be provided around the conductive member, the toroidal inductive coupling comprising a ring like portion of magnetic material carrying a winding such that current flowing in the conductive member will induce a current in the winding, which current can be used for powering the below plug apparatus.

Thus the pickup arrangement may comprise one or more of the spaced pair of contacts, the conductive member, and the toroidal inductive coupling.

In other cases the pickup arrangement may comprise the spaced pair of contacts with a harvesting unit galvanically connected therebetween. In some cases the downhole metallic pipe may comprise an insulation joint in the region of the below plug apparatus with one of the contacts contacting the downhole metallic pipe above the insulation joint and one below. This can be useful for alternating current and direct current implementations.

Where practical any other suitable methods may be used as a pickup arrangement. For example, a pickup toroid as an inductive coupling may be provided around the outside of a piece of downhole metallic pipe present in the installation.

The downhole power supply apparatus may comprise a downhole power supply tool. The tool may comprise one or more of: the at least one battery, the power transfer arrangement.

The downhole power supply apparatus may comprise a spaced pair of contacts for making electrical contact with the downhole metallic pipe.

At least one of the contacts may comprise a conductive centraliser for making electrical contact with the downhole metallic pipe At least one of the contacts may be arranged as a setting means for gripping into the material of the downhole metallic pipe for holding the apparatus in position.

At least one of the contacts may comprise a plurality of high force spring centraliser units.

At least one of the contacts may be arranged to bite into the material of the downhole metallic pipe for enhancing electrical connection. At least one of the contacts may comprise teeth.

The downhole power supply apparatus may comprise a conductive member provided between the spaced pair of contacts such that a current flowing in the conductive member will cause a current to flow in the downhole metallic pipe. A toroidal inductive coupling may be provided around the conductive member, the toroidal inductive coupling comprising a ring like portion of magnetic material carrying a winding such that current flowing in the winding will induce a current in the conductive member which can therefore be applied to the downhole metallic pipe. The at least one battery may be arranged for driving current through the winding.

In some cases the power supply apparatus may be a distributed apparatus made up of at least two separate units. It might be chosen say to locate the batteries at a shallower location in the well than at least a part of the power transfer arrangement. The batteries then could be located at a cooler location and said at least a part of the power transfer arrangement may be located adjacent the plug. It might be chosen say to locate the batteries and at least some electronic components of a shallower location. The at least some electronic components may comprise a transmitter, receiver or transceiver.

The at least part of the power transfer arrangement may comprise means for injecting signals onto the downhole metallic pipe. The at least part of the power transfer arrangement may comprise the toroidal inductive coupling.

The downhole power supply apparatus may comprise insulation means for insulating the conductive member from the downhole metallic pipe at locations away from the conductive centralisers.

The downhole power supply tool may carry a plurality of insulating spacers. These may act as the insulation means.

Thus the power supply apparatus may comprise one or more of the spaced pair of conductive centralisers, the conductive member, the insulation means and the toroidal inductive coupling.

In other cases the downhole power supply apparatus may comprise the spaced pair of contacts with a power supply unit of the apparatus galvanically connected therebetween. In some cases the downhole metallic pipe may comprise an insulation joint in the region of the downhole power supply apparatus with one of the contacts contacting the pipe above the insulation joint and one below. This can be useful for alternating current and direct current implementations.

In other embodiments different methods may be used for applying electrical signals to the metallic pipe above the plug. Thus for example, the power transfer arrangement may comprise a toroid as an inductive coupling provided around the outside of a piece of downhole metallic pipe present in the installation.

Note that at least some parts of power supply apparatus and/or power pick up arrangement may be used in the transmission and/or reception of communication signals as well as in the delivery of power.

Thus, for example, signals to and/or from the downhole communication apparatus in the below plug apparatus may pass through the spaced pair of conductive centralisers, the conductive member, and the toroidal inductive coupling of the power pick up arrangement.

The downhole sensing tool and the downhole power supply tool may be disposed adjacent to, whilst on opposite sides of, the sealing plug.

Where the downhole metallic pipe comprises liner, liner insulation means may be provided for insulating the liner from the surrounding formation. The liner insulation means may comprise an insulating layer provided on the outside surface of the liner.

The liner insulation means may be provided in the region of one or more of: the downhole power supply apparatus, the below plug apparatus, the downhole sensing apparatus, the first sealing plug, the downhole power supply tool, the downhole sensing tool.

The location and extent of the liner insulation means may be chosen in an effort to maximise transfer of power from the downhole power supply apparatus to the below plug apparatus.

The downhole power supply apparatus may be arranged to apply direct current power signals to the downhole metallic pipe. Of course appropriate pickup equipment is then required.

Preferably the downhole power supply apparatus is arranged to apply alternating current power signals to the metallic pipe.

A frequency of the power signals applied to the downhole metallic pipe by the downhole power supply apparatus may be chosen in an effort to maximise transfer of power from the downhole power supply apparatus to the below plug sensing apparatus. The chosen frequency may take into account efficiency and practical concerns that favour higher frequency and loss in the metallic structure which favours lower frequency. The frequency may preferably be in the range 1 to 10 Hz. However, higher frequencies can be made to work especially over shorter ranges. In such a case the frequency might preferably be up to 100 Hz or up to 1000 Hz.

According to another aspect of the invention there is provided a well installation comprising a system as defined above and a borehole provided with downhole metallic pipe, for example liner.

Each of the optional features following each of the aspects of the invention above is equally applicable as an optional feature in respect of each of the other aspects of the invention and could be written after each aspect with any necessary changes in wording. The optional features are not written after each aspect merely in the interests of brevity.

Figure 2:
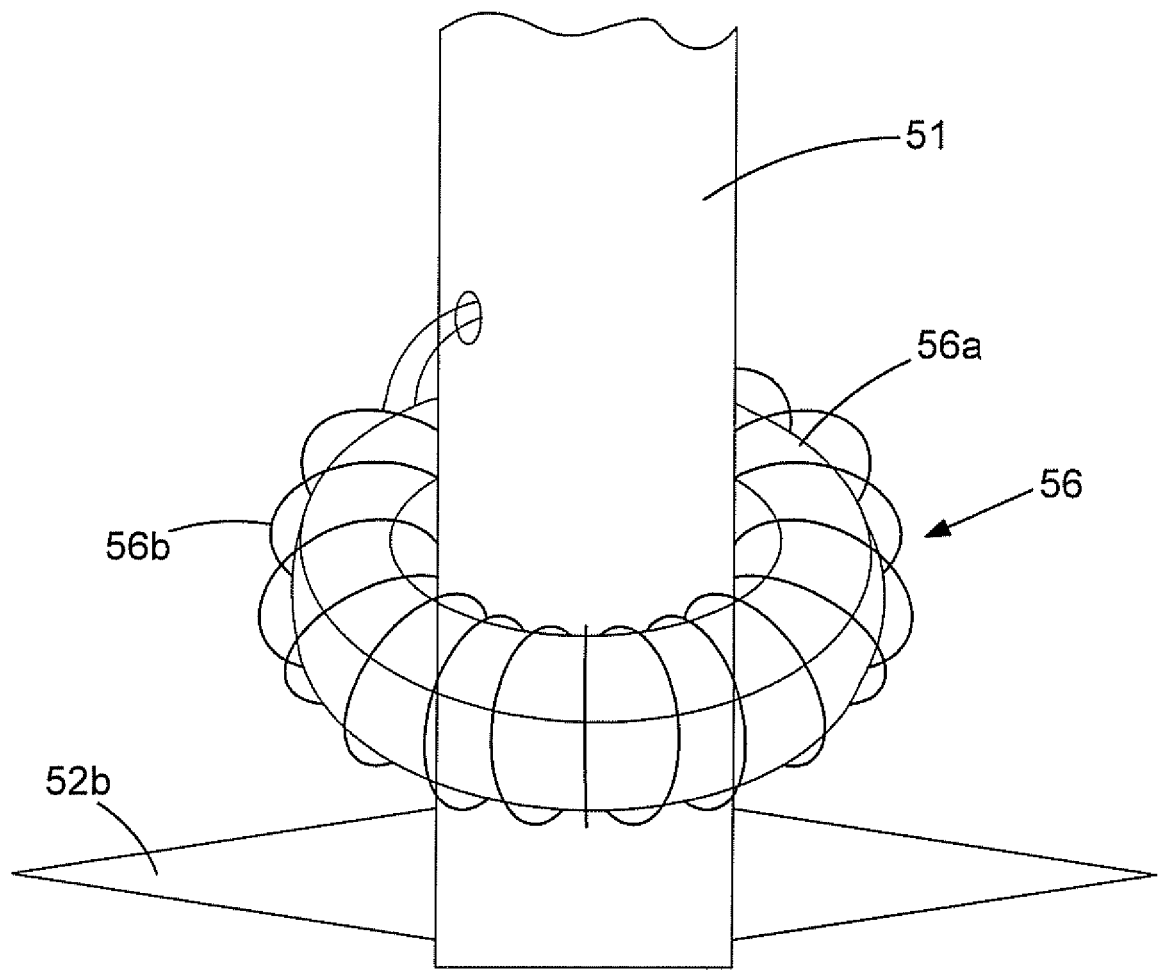
Figure 3:
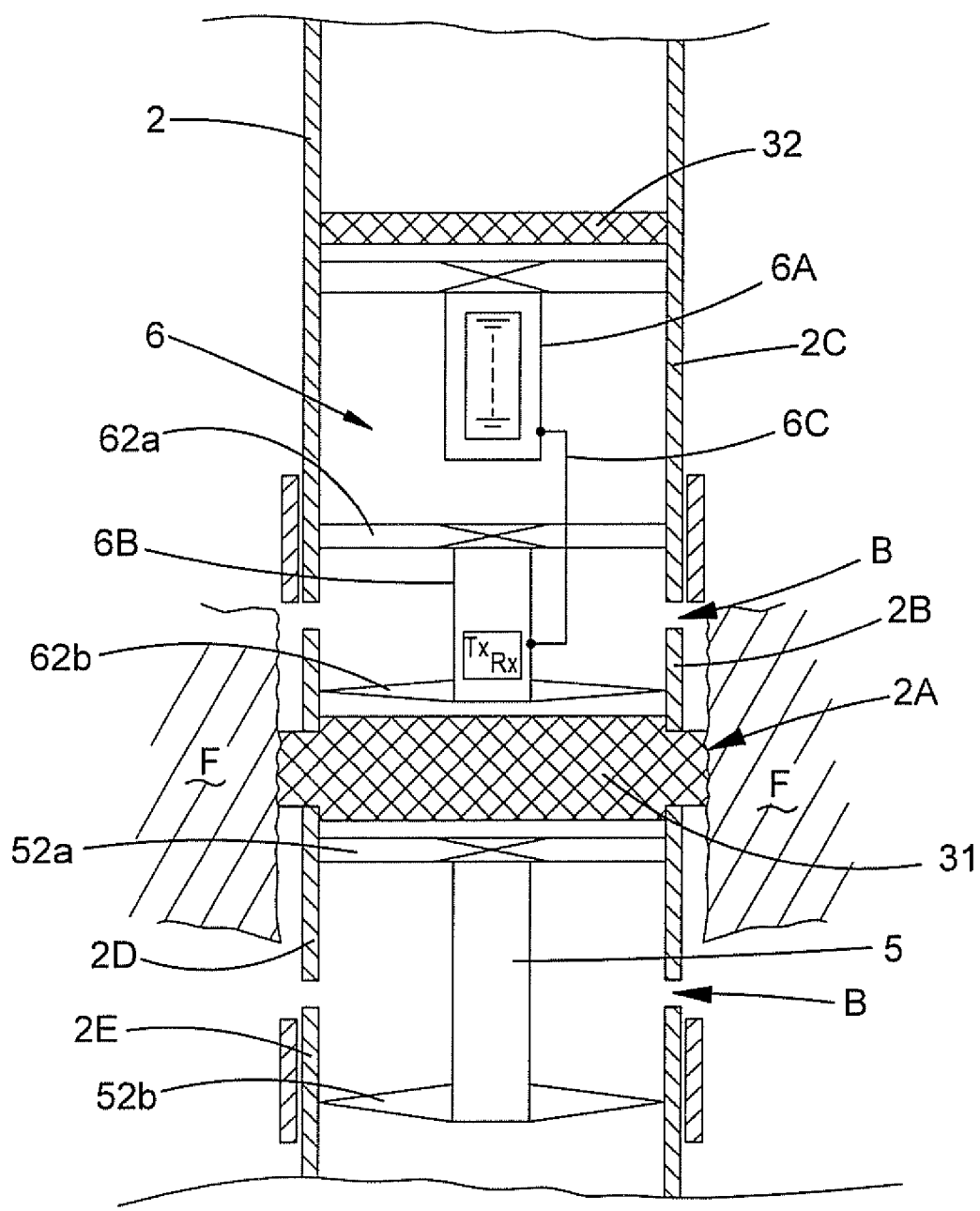
Figure 4:
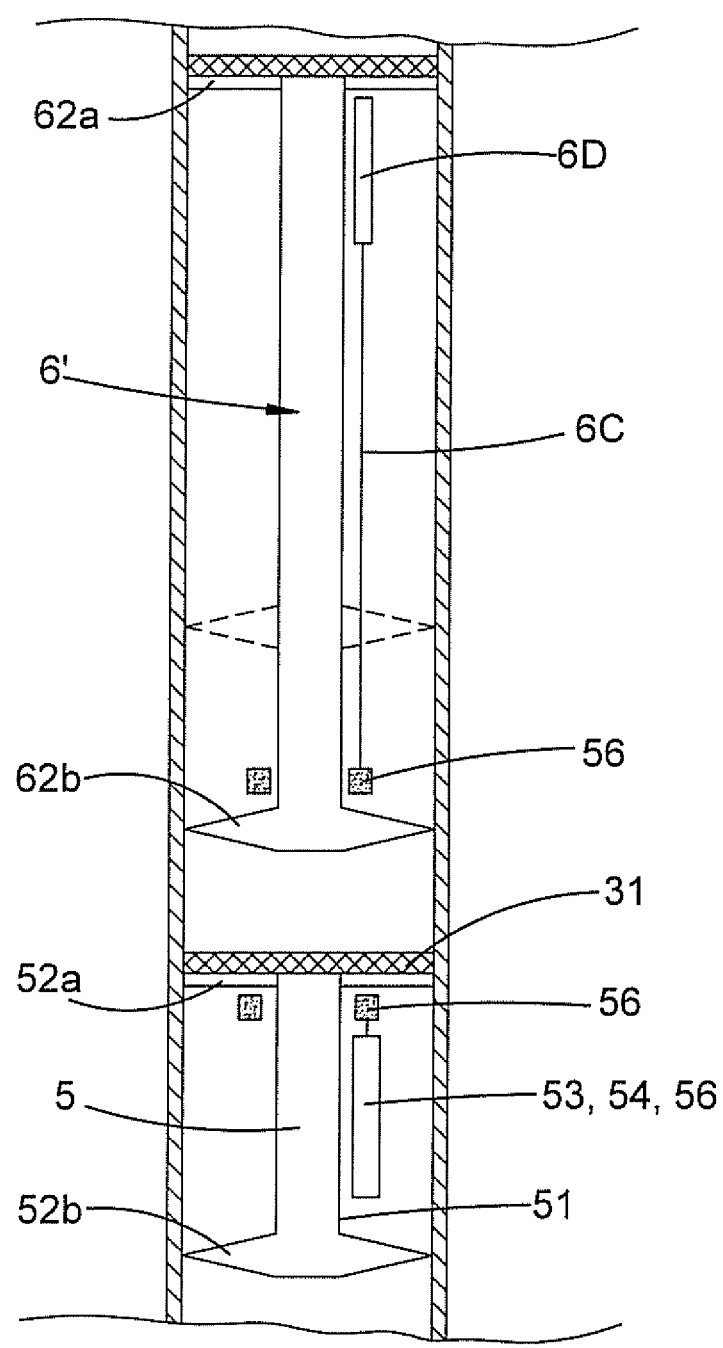

Embodiments of the present invention will now be described, by way of example only, with reference to the accompanying drawings in which:

FIG. 1 schematically shows an abandoned well installation including a well monitoring system;

FIG. 2 schematically shows part of a downhole power supply apparatus of the abandoned well monitoring system shown in FIG. 1;

FIG. 3 schematically shows part of a downhole power supply system which may be used in a monitoring system of the type shown in FIG. 1; and FIG. 4 schematically shows part of a downhole power supply system which may be used in a monitoring system of the type shown in FIG. 1.

FIG. 1 shows an abandoned well installation included in a well monitoring system. The abandoned well installation comprises a wellhead 1 at the surface and metallic liner 2 running down into the borehole of the well in the formation F. This is an abandoned well and the borehole is sealed at a downhole location by a downhole sealing plug of cement 31. The installation is shown in simplified form and not to scale. Typically there will be multiple concentric runs of casing provided at the surface penetrating to different depths. These details are omitted as they are not relevant to the present embodiment. Further as explained in the introduction the present ideas may be used in situations other than monitoring abandoned wells. Thus, for example, metallic pipe other than liner may be present and used, and other types of sealing plugs might be present in other embodiments. Moreover, in other embodiments equipment other than that used for monitoring wells may be provided and powered.

The sealing plug of cement 31, in the present embodiment, is provided at a location above that of any perforations 21 in the liner 2 which serve to allow product P from the formation F to flow into the bore of the liner 2. Product P may also flow into this lower region of the liner below the plug 31 through a lower open end of the liner depending on the precise structure of the well. However, the sealing plug 31 should effectively stop any product flowing further up the borehole than the underside of the plug 31.

The monitoring system comprises a surface unit 4, below plug apparatus, embodied in this embodiment by downhole sensing apparatus 5 located below the sealing plug 31, and downhole power supply apparatus 6 located above the sealing plug 31. In the present installation there is a further sealing plug of cement 32 provided at a location in the liner 2 above that of the power supply apparatus 6. The provision of two plugs 31, 32 in the well provides a further level of safety against failure of sealing of the abandoned well. Whilst in the present case the second sealing plug 32 is located relatively deep in the well, in other cases such as a second sealing plug 32 may be located just below the wellhead.

In the present embodiment the downhole sensing apparatus 5 is in the form of a downhole sensing tool 5 which provides all of the components of the downhole sensing apparatus. Note however in other circumstances the downhole sensing apparatus 5 may be in more of a distributed form such that there may be multiple tools located downhole making up the downhole sensing apparatus 5. The same can also be true where the below plug apparatus is embodied in something other than downhole sensing apparatus, for example if the below plug apparatus comprises an actuatable component such as a valve which, say, is controlled from the surface.

The downhole sensing tool 5 comprises a metallic electrically conductive housing portion 51 which is supported within the liner 2 via a pair of conductive centralisers 52a and 52b. A first of these conductive centralisers 52a is arranged as a setting means so as to bite into the metal of the liner 2 and hold the tool 5 in position. Both of the conductive centralisers serve to make electrical contact with the metallic liner 2. Thus there is electrical conduction path from the liner 2 through a first of the conductive centralisers 52a, through the conductive housing 51, and then through the second of the conductive centralisers 52b back to the liner 2.

The tool further comprises a central unit 53 connected to a local battery 54 and a charge storage unit 55. The central unit 53 comprises at least one sensor 53a for sensing pressure and/or temperature in the region of the tool, a communications unit 53b and a control unit 53c.

The communications unit 53b is connected to a toroidal inductive coupling 56 which is provided around the conductive housing 51 of the tool 5. FIG. 2 shows the toroidal inductive coupling 56 in more detail whilst still schematically. The toroidal inductive coupling 56 comprises a ring like portion of magnetic material 56a around which is wound a winding 56b such that current flowing in the conductive housing 51 through the central aperture of the inductive coupling 56 will induce current to flow in the winding 56b and vice versa.

Together the conductive centralisers 52a, 52b, the conductive housing 51 and the inductive coupling 56 act as a power pick up arrangement for picking up electrical power from the liner 2. These same components may also be used for picking up data carrying signals from the liner 2 as well as applying data carrying signals to the liner 2.

The downhole power supply apparatus 6 in the present embodiment is provided in the form of a downhole power supply tool 6. Thus in the present embodiment the downhole power supply tool 6 provides all of the components of the downhole power supply apparatus. However, again in alternatives, a more distributed form of downhole power supply apparatus may be used which comprises a plurality of downhole tools.

The downhole power supply tool 6 comprises a conductive housing portion 61 and a pair of conductive centralisers 62a, 62b for supporting the downhole power supply tool 6 in the liner 2. Again a first of the conductive centralisers 62a is arranged as a setting tool for biting into the material of the metallic liner 2 to hold the tool 6 in place. Again both the conductive centralisers 62a and 62b of the downhole power supply tool 6 provide an electrical connection to the liner 2. Thus again there is an electrical conduction path through the tool, namely from the liner 2 through a first of the conductive centralisers 62a, through the conductive housing 61, and through the other of the conductive centralisers 62b back to the liner 2.

The power supply tool 6 further comprises a central unit 63 and a battery pack 64. The central unit 63 comprises a communications unit 63*b* and a control unit 63*c*.

The communications unit 63*b* is connected to a toroidal inductive coupling 66 provided around the conductive housing 61.

The toroidal inductive coupling 66 is of the same general structure as the toroidal inductive coupling 56 of the downhole sensing tool 5 as shown in more detail in FIG. 2.

It will be seen that in general terms there are some significant structural similarities between the downhole sensing the tool 5 and the downhole power supply tool 6.

The battery pack 64 provided in the downhole power supply tool 6 is provided for supplying power to the downhole sensing tool 5 as will be explained in more detail below. Correspondingly a large number of batteries may be provided in this battery pack 64 and the downhole power supply tool 6 thus may have a significant length causing a significant spacing between the first and second conductive centralisers 62*a* and 62*b*. A plurality of insulating spacers 65 are provided around the conductive housing 61 at positions spaced along its length to help prevent mechanical and therefore electrical contact between the conductive housing 61 and the liner 2 at locations between the conductive centralisers 62*a*, 62*b*.

In a more distributed form of downhole power supply apparatus the batteries may be housed separately away from the central unit 63 and/or communications unit 63*b*. Thus in an alternative the power supply apparatus may comprise a first battery carrying unit and a second power signals unit. The battery carrying unit may be located at say a cooler region in the well and the power signals unit may be located adjacent the plug. A cable connection may then be provided to supply power from the battery carrying unit to the power signals unit. As will be appreciated a shallower location will typically be cooler.

The surface unit 4 comprises a communications unit 43*b*, a surface power supply 44 and a control unit 43*c*. The communications unit 43*b* is connected to the well head 1 and hence may apply communications signals to the liner 2 via the well head 1 and pick up communications signals from the liner 2 via the well head 1. The surface power supply 44 is connected to the liner 2 via a cable at a downhole location. In practical terms this cable 45 may be run down inside the well as far as the second cement plug 32 if desired. However, in some circumstances this may be impractical or prohibitively expensive and thus the cable 45 connection may be made nearer the surface.

In operation, the downhole sensing tool 5 will take a parameter reading such as a pressure or temperature readings at a desired time. This time may be determined according to a schedule under the control of the downhole sensing tool control unit 53*c* or as a result of an instruction received from the surface.

The resulting parameter measurement will then be communicated to the surface by virtue of the downhole sensing tool communication unit 53*b* applying the signal to the liner 2 via the inductive coupling 56, the metallic housing 51 and the conductive centralisers 52*a* and 52*b*. The resulting signal will propagate along the liner 2 where it may be picked up by the communications unit 43*b* of the surface unit 4.

As will be appreciated, the surface communication unit 43*b* may transmit signals to the downhole sensing tool 5 via the same mechanism in reverse. That is signals applied by the surface communication unit 43*b* to the well head and hence liner 2 can be picked up by the downhole tool communication unit 53*b* via the inductive coupling 56 and the metallic housing 51 and conductive centralisers 52*a* and 52*b* of the downhole sensing tool 5.

In alternatives different signalling methods may be used, such as acoustic methods or a separate winding or whole inductive coupling might be provided for communication at the downhole sensing tool 5.

In each such case, there is a question as to where the power comes from for the downhole sensing tool 5 to take its parameter readings and transmit these towards the surface. First it will be noted that the downhole sensing tool 5 has a local battery 54. This local battery 54 may be used for powering such readings and transmissions whilst it has charge. However as discussed above, the temperature in the region of the downhole sensing tool 5 can be relatively high, in some cases say in the order of 150° C. or higher. Thus due to dissipation effects, the lifetime of the local battery 54 in the downhole sensing tool 5 will be relatively limited. In other cases the temperature might be lower but a similar effect may still be seen. Thus at some point in time, if the only power source available were the local battery 54, then it would no longer be possible for the downhole sensing tool 5 to operate.

In the present embodiment two alternative sources of power are provided.

First and most importantly, the downhole power supply tool 6 is provided specifically for providing power to the downhole sensing tool 5. Because the downhole power supply tool 6 is provided above the first cement plug 31 and out of direct contact with the product in the formation F, the temperature in this zone will be much lower. In some cases this might be say 30° C. Thus the dissipation effect on the battery pack 64 provided in the downhole power supply tool 6 will be much lower. Again this temperature might be higher (or lower) than 30° C., but almost invariably there will be a temperature difference and thus something to be gained.

Thus power from the downhole power supply tool 6 may be used at such a time when there is insufficient power in the local battery 54 in the downhole sensing tool 5. Note that in some alternatives, the local battery 54 in the downhole sensing tool 5 might be omitted altogether.

Typically the available energy from the battery pack 64 will be much greater than that available from the local battery 54.

While in the present embodiment a particular arrangement has been described, more generally it may be expressed that the power supply apparatus, and particularly the at least one battery, is located in a zone which is sealed from the zone below the sealing plug. Typically, the sealing plug will provide such a seal. Where the sealing plug seals a bore, the power supply apparatus, and particularly the at least one battery, may most likely be disposed in that bore above the plug. Where the sealing plug seals an annulus, the power supply apparatus, and particularly the at least one battery, may most likely be disposed in that annulus.

In the present embodiment the control units 53*c* and 63*c* of the tools 5, 6 control whether power will be used from the local battery 54 or the battery 64 of the downhole power supply tool 6.

Where it is determined by the downhole sensing tool control unit 53, that the charge level in the local battery 54 has dropped below a pre-determined threshold, an instruction signal is sent from the downhole sensing tool 5 to the downhole power supply 6.

This signal may be sent by the communication unit 53*b* of the downhole sensing tool 5 applying signals to the liner 2 via the inductive coupling 56, conductive body portion 51 and conductive centralisers 52*a*, 52*b* which in turn can be picked up by the communication unit 63*b* of the downhole power supply tool 6 via its respective inductive coupling 66 and the respective conductive housing portion 61 and conductive centralisers 62, 62*b*.

Where an appropriate activating control signal is received at the downhole power supply tool 6, the communications unit 63*b* can be used to apply power signals to the liner 2 via the inductive coupling 66 and conductive housing portion 61 and conductive centralisers 62*a*, 62*b* such that energy from the battery pack 64 in the downhole power supply tool 6 is applied to the liner 2 for pick-up by the downhole sensing tool 5.

As will be appreciated, the applied power is picked up by the conductive centralisers 52*a*, 52*b*, the conductive housing 51 and the respective conductive coupling 56.

Here the power may be directly used for performing parameter readings and transmitting communication signals back out of the downhole sensing tool 5 towards the surface unit 4 or the power may be stored at the charge storage means 55 provided in the downhole sensing tool 5 for use at a later time.

Note that the charge storage means 55 might comprise for example one or more rechargeable batteries or one or more capacitor. In some implementations rather than providing a separate local battery 54 and a separate charge storage means 55, a common rechargeable battery might be used to provide both functions. In other cases the local battery 54 and charge storage means 55 may be dispensed with altogether. In such a case power may be supplied directly from the downhole power supply tool 6.

The energy stored in the downhole power supply apparatus 6 may be used over a longer timeframe than that stored in the local battery 54. That is to say because of the lower temperature in the region of the downhole power supply tool 6 it can be expected that the batteries 64 will not dissipate at such a rate and thus their power can be drawn occasionally over a longer period. However of course at some stage this energy will be exhausted.

In the present implementation once this has occurred then the downhole sensing tool 5 may be powered by remote power delivered from the surface power supply 44. This is a particularly lossy form of power supply and thus using power from the batteries 54, 64 located downhole is preferable when these are available but once they are exhausted this provides a useful elongation of life of the parameter reading capabilities of the downhole sensing tool 5.

Where the surface unit 4 is used to supply power to the downhole sensing tool 5, power from the surface power supply 44 is applied to the liner 2 via the cable 45. This power is propagated along the liner 2 although significant portions of it will be lost to the environment. Some of the power will reach the region of the downhole sensing tool 5 where it may be picked up via the previously explained mechanism. That is to say, a proportion of the current will flow through the first conductive centraliser 52*a*, then the conductive housing 51 and then the second conductive centraliser 52*b* so inducing a current in the conductive coupling 56 which may be picked up by the communication unit 53*b*. Again this remotely provided power might be used instantaneously or stored in the charge storage device 55 for later use.

In an alternative, power from the surface power supply 44 may be supplied to a charge storage means, such as a rechargeable battery at the downhole power supply apparatus 6. In such a case the power may then be supplied onto the downhole sensing tool 5 as desired.

It can be seen that the three different sources of power provided in the monitoring system/method described above can be usefully used at different times to provide a longer effective life of a downhole sensing tool.

Moreover it can be usefully noted that often when such a downhole sensing tool 5 is first installed, there will be a desire for a higher number readings i.e. a greater frequency of readings than later. The power for these initial readings may be supplied by the local battery 54. Once this has been expended, the frequency of readings desired will tend to be lower at which time power can be supplied by the downhole power supply apparatus 6. Then readings may be provided over a usefully long period because although it is a very lossy mechanism to transfer power from the power supply apparatus 6 to the downhole sensing apparatus 5 this only needs to be done occasionally. Moreover in between times, because of the lower temperature in the region of the downhole power supply apparatus 6, it can be expected that the charge in the batteries 54 will hold up reasonably well. Thus when the energy stored in the battery 64 of the downhole power supply apparatus 6 has been expended a significant further period will have expired. At this time readings will generally be required even less frequently. Then the even more lossy and energy hungry strategy of supplying power from the surface can be tolerated as only occasional readings are required.

Thus, as an example, the local battery 54 might be used for powering readings and transmissions for say three years after which, the downhole power supply apparatus 6 might be used for a further seven years and remote power used only after the first ten years have expired.

Correspondingly when the downhole sensing tool 5 is first installed and the local battery 54 is being used, readings might be taken once a day. Whereas once three years have expired and the downhole power supply tool 6 is being used to supply power, readings might be taken once a week. Once the next seven years have passed, readings might be taken only once a month using remote power.

The control means 43*c* and/or 63*c* and/or 53*c* may be arranged to control the taking of readings and use of the relevant power supply according to such a schedule.

In order to improve performance of the transmission of power from the downhole power supply apparatus 6 to the downhole sensing tool 5 across the first cement plug 31, insulation I1, I2, I3 may be provided outside of the liner 2 between the liner 2 and the formation. This may be located in the region of the cement plug 31 and/or the region of the power supply tool 6 and/or the region of the downhole sensing tool 5. The location and extent of this insulation may be selected in order to enhance performance as far as possible. The location and extent of such insulation may be modelled for a particular well installation to try to provide maximum performance.

It will appreciated that alternating current signals are being applied to the liner and picked up from the liner in the above described methods and system. The frequency of these signals may be selected to give the best performance in a particular implementation. Again modelling may be used with the aim of achieving this. A typical frequency might be in the order of 1 to 10 Hz. Direct current signals could be used in alternative techniques.

With a system of the type described above, it might be expected to be possible to pick up 50 mW of power at the downhole sensing tool 5 as supplied by the downhole power supply tool 6 or the surface unit 4. In order to achieve this, a significant amount of power needs to be input to the system. In the case of remote power one may need to apply 100 W of power to the liner 2 with the cable 45. In the case of supplying power from the downhole power supply tool 6 about 5 W of power may need to be supplied to the liner 2.

There will be an optimal spacing between the contacts used with the power supply apparatus and also for the spacing between the contacts used with the downhole sensing tool. Skin effect will come into play to increase effective resistance of the steel tubing as frequency increases. This has to be balanced with loss across the cement plug section and optimum spacings may be determined by modelling. Similarly, modelling in any particular given installation might be used in order to determine an optimal frequency for transmission when alternating current signals are used.

In a further development which may be used in any of the embodiments or alternatives described, consumption of energy/power by the downhole sensing tool 5 may be managed by switching off the electronics in the downhole sensing tool other than a very low power clock for a pre-determined time period and turning the electronics back on when this pre-determined time period is shown to have elapsed by use of the very low power clock. Such a clock may be expected to have or experience timing drift over time and this may be tracked or corrected by synchronisation with the surface.

Note that in the present specification where the expression "surface" is used, this is used to mean either the land surface for a land well or the seabed surface for a sub-sea well or alternatively the wellhead platform as appropriate, and also positions above these locations where appropriate.

There are different constructions for abandoned wells including those with a wellhead at the seabed, those with casing protruding above the mudline and those with casing cut off below the mudline. The present techniques may be used with any of these. Where the casing is cut off below the mudline a spear contact may be used to connect the surface unit 4 to the casing. The spear may comprise a length of downhole pipe carrying a conductive centraliser.

In a further alternative, at least one of the conductive centralisers of the downhole sensing tool and/or the power supply apparatus may be embodied by a plurality of high spring force centralisers. Alternatively contacts may be provided which have teeth which are forced into the metallic pipe to provide very low resistance and to reduce the risk of chemical based growth overtime forming an insulation layer under the blades of a centraliser.

In a further alternative, the first cement plug 31 may comprise a secondary plug element in the form of a hanger for supporting one or more tools of the downhole sensing apparatus and simultaneously making electrical contact with the liner so as to be able to act as a contact for picking up and supplying signals—that is, to take the place of one of the conductive centralisers.

As mentioned above, whilst in the drawing shown in FIG. 1, the second cement plug 32 is provided relatively deep in the well, in other installations and perhaps more commonly, the second cement plug 32 will be provided near to the wellhead, or rather, near the top of the borehole. At least in such cases a separate electrode would be provided for use in applying signal to the downhole metallic structure 1, 2. That is to say, the surface unit 4 would be connected between the wellhead 1 (where present, and to the metallic pipe near the mudline/surface where not) on the one hand and the separate electrode on the other hand. Where the well is a sub-sea well such an electrode would be a seawater electrode. Where the well is a land well such an electrode would be driven into the land surface at a predetermined distance from the well. Such electrodes provide a reference earth against which the power currents and signalling currents may be applied.

In another alternative to the arrangement shown above, the liner 2 may comprise an insulation joint in the region of the downhole sensing tool (below plug apparatus) and/or the region of the downhole power supply apparatus.

When this is the case, signals may be applied to, and picked up from, the liner 2 across the respective insulation joint. That is to say the downhole sensing tool 5 may be connected across a respective insulation joint and the downhole power supply apparatus 6 may be connected across a respective insulation joint. This facilitates the application of signals directly to the liner and can be used for both for applying and picking up alternating current signals and for applying and picking up direct current signals.

Where insulation joints are present then direct galvanic connections may be used between components in the respective tools 5, 6 and the liner and the toroids 56, 66 can be dispensed with if desired. It will be appreciated that, in general terms, the precise technique used to apply signals to the liner and pick signals up from the liner is not of fundamental importance to the present invention. Thus these examples given are examples which may be useful in particular circumstances.

It should be noted that in other embodiments with below plug apparatus which is not downhole sensing apparatus then besides the absence of a sensor for sensing a parameter below the plug, such below plug apparatus may have any or all of the features of the above described downhole sensing apparatus and operate as part of the above described system. So to may there be a below plug tool having the features of the downhole sensing tool minus the sensor.

Further, in such cases the downhole device requiring power may be say, a communication device (eg a repeater) and/or an actuator or other device accepting control signals (eg a valve).

Where the sealing device, ie plug, is provided in an annulus, at least part of the power supply apparatus, in particular, say the batteries of the power supply apparatus, maybe located in the annulus.

As a specific example an EM and/or acoustic repeater might be located in an annulus such as say the B or C annulus (where, as is conventional, the 'A' annulus is that nearest to the main bore, the 'B' annulus is the next annulus out and so on) relatively near the surface for acting as a repeater between a downhole device and the surface. Where such a repeater is located below a plug, the above techniques then can be used with power supply apparatus located above the annular plug in the annulus of the repeater and power delivered across the plug from the power supply apparatus to the repeater.

FIG. 3 shows part of an alternative well monitoring system in a well installation. This system is similar to that described above in relation to FIGS. 1 and 2 and comprises power supply apparatus 6 between two sealing plugs 31, 32 and a downhole sensing apparatus 5 below the lower plug 31. Where not otherwise mentioned this system has the same features and operation as those described above.

In this alternative, the power supply apparatus is distributed with a battery carrying unit 6A and a power signal unit 6B with a cable (in this case, tubing encased cable—TEC) 6C supplying power from the battery carrying unit 6A to the power signal unit 6B. Otherwise the function and operation of the power supply apparatus 6 is as in the embodiments described above. Of course a non-distributed form of power supply apparatus could also be used in place of the distributed form shown.

The liner 2 and lower plug 31 in this alternative are different than the embodiments described above in that an axial spacing 2A is provided in the liner 2 such that there is an uncased portion of borehole where the material of the plug 31 seals against the formation F in which the borehole is drilled. Thus there is no longer a continuous length of metallic pipe bridging the location of the lower plug 31.

Further in this system additional breaks B are provided in the liner 2 above and below the lower plug 31. Thus, there is a first portion of the liner 2B located above the plug 31 which is not galvanically connected to the remainder of the liner 2C leading away from the plug 31.

Similarly in this embodiment below the plug 31 there is a portion of liner 2D which is not galvanically connected to the remainder of the liner 2E leading away from the plug 31 further into the well.

In the present embodiment each of these breaks B in the liner 2 is in the form of an auxiliary axial spacing. These may be formed in the same way as or a different way to the main axial spacing 2A. In the present embodiment these auxiliary axial spacings are left open. This forms a fluid communication path from the interior of the casing to the annulus between the liner 2 and the surrounding formation F. However, this can be tolerated because of the seal between the sealing material of the plug 31 and the formation F at the main axial spacing 2A.

If desired either or both of the breaks B maybe filled with a suitable sealing material. In a further alternative, rather than an open axial spacing being provided at the breaks B an insulating section of liner might be introduced into the run of liner. It should be noted that here, at these breaks B, what is desired is providing a portion of liner 2B, 2D which is isolated from the adjacent portions of liner 2C, 2E as distinct from the main axial spacing 2A where exposing the formation F is an intrinsic part of forming the seal with the plug 31.

With the breaks B introduced into the runs of liner 2 then the respective isolated portions of liner 2B, 2D can act as electrodes for allowing the application of signals to the formation F and the pickup of signals from the formation F. As will be seen in FIG. 3, one of the spaced contacts 62b, 52a of each of the power supply apparatus 6 and a downhole sensing apparatus 5 respectively contacts with a respective one of the electrodes 2B, 2D. Overall this facilitates the transmission of power signals and communication signals across the plug 31, even though the liner is non continuous past the plug 31. As will be appreciated this allows the delivery of power from the power supply apparatus 6 and the surface (not shown) as desired as well as communication in either or both directions.

FIG. 4 shows part of an alternative well monitoring system in a well installation. This system is similar to that described above in relation to FIGS. 1, 2 and 3 and comprises power supply apparatus 6 between two sealing plugs 31, 32 and a downhole sensing apparatus 5 below the lower plug 31. Where not otherwise mentioned this system has the same features and operation as those described above.

The downhole sensing tool 5 in this embodiment is similar to that described with reference to FIG. 1. There are some constructional differences but the functioning and operation is the same as in the downhole sensing tool of FIG. 1 and thus detailed description is omitted. The differences reside in an inversion of the arrangement so that the inductive coupling 56 is at an upper end of the tool 5, the provision of (suitably housed) components 53, 54, 56 of the tool 5 alongside the conductive body 51 of the tool rather than internally, and the upper contact 52a comprising a metallic part of the lower plug 31. In this case the conductive body 51 of the tool may comprise a length of downhole pipe—eg as might be used as production tubing.

In this alternative, the power supply apparatus is distributed. The power supply apparatus comprises an elongated power supply tool 6' which in turn comprises a length of downhole pipe 61' with spaced contacts 62a, 62b for contacting with the surrounding liner 2. In this case the upper contact 62a is a metallic part of the plug 32. The elongated power supply tool 6' comprises a battery and electronics carrying unit 6D mounted on the pipe 61' towards one end and an inductive coupling 56 mounted on the pipe 61' towards the other end. The inductive coupling 56 is connected to the battery and electronics carrying unit 6D via a cable 6C running alongside the pipe 61'—which in this case is a tubing encased cable (TEC). Thus the tool 6' and in particular the inductive coupling 56 may be mounted adjacent to the lower plug 31, but the battery and electronics carrying unit 6D can be spaced away therefrom.

The battery and electronics carrying unit 6D comprises a battery pack (not shown) and central unit (not shown) in the same way as the power supply tool 6 described in respect of FIG. 1 and the function and operation of the power supply apparatus 6' is basically the same as for the power supply apparatus 6 in the embodiments described above. The difference from the system shown in FIG. 1 resides in the fact that in the system of FIG. 4 there is greater spacing between the inductive coupling 56 and the batteries and electronics. This means that the batteries and electronics may be located at a cooler region—ie typically shallower in the well. The benefit gained will be a function of the temperature gradient in the well and the spacing between the battery and electronics unit 6D and the lower end of the tool 6'. The spacing might be at least 50 m, or more preferably at least 100 m, or even at least 500 m.

In this case the upper contact 62a may act as the operative upper contact in the system but as the tool increases in length, it is more likely that glancing contact between the downhole pipe 61' of the tool and the casing will occur and this will act as the upper contact. If desired a further conductive centraliser (as shown in dotted lines) may be provided part way along the tool 6'. This may be desirable in some cases to improve transmission characteristics, or at least make these more predictable by reducing the significance of glancing contacts.

The invention claimed is:

1. A downhole power delivery system for use in a well, the well comprising downhole metallic pipe running in a borehole of the well with a downhole sealing plug provided in a bore or annulus at least partly defined by the downhole metallic pipe, the power delivery system comprising:
   a below plug apparatus located in the borehole below the plug, the below plug apparatus including a downhole device requiring electrical power; and
   a downhole power supply apparatus located in the borehole above the plug, the power supply apparatus comprising at least one battery for powering the downhole device, the downhole power supply apparatus and below plug apparatus being arranged for delivering electrical power from the downhole power supply apparatus to the downhole device across the downhole sealing plug, wherein the power supply apparatus comprises a power transfer arrangement for applying electrical current to the downhole metallic pipe above the plug and the below plug apparatus comprises a power pick up arrangement for picking up electrical current from the downhole metallic pipe below the plug to power the downhole device.

2. A downhole power delivery system according to claim 1 comprising at least one alternative source of power which is separate from the at least one battery of the power supply apparatus.

3. A downhole power delivery system according to claim 2 comprising a control means for controlling which source of power is used by the below plug apparatus.

4. A downhole power delivery system according to claim 3 in which the below plug apparatus comprises at least one local battery.

5. A downhole power delivery system according to claim 4 in which the control means is arranged for controlling when the below plug apparatus uses power from the local battery and when the below plug apparatus uses power from the power supply apparatus.

6. A downhole power delivery system according to claim 5 in which the below plug apparatus is arranged under control of the control means to operate using the local battery whilst this has charge and switch to use power from the power supply apparatus when the local battery does not have charge.

7. A downhole power delivery system according to claim 5 in which the control means is arranged to cause the below plug apparatus to use power from the local battery for a predetermined period after a start time and arranged to cause the below plug apparatus to use power from the power supply apparatus after said predetermined period.

8. A downhole power delivery system according to claim 3 which comprises a surface power supply for supplying power to the below plug apparatus by applying electrical current to the downhole metallic pipe above the plug.

9. A downhole power delivery system according to claim 8 in which the control means is arranged for controlling when the below plug apparatus uses power from the surface power supply and when the below plug apparatus uses power from the downhole power supply apparatus.

10. A downhole power delivery system according to claim 9, wherein the below plug apparatus comprises at least one local battery, and wherein the control means is arranged for controlling when the below plug apparatus uses power from the surface power supply, when the below plug apparatus uses power from the local battery, and when the below plug apparatus uses power from the downhole power supply apparatus.

11. A downhole power delivery system according to claim 8, wherein the below plug apparatus comprises at least one local battery, and wherein the control means is arranged to cause the below plug apparatus to use power from the local battery for a first predetermined period after a start time and arranged to cause the below plug apparatus to use power from the downhole power supply apparatus after said first predetermined period and for a second predetermined period and to use power from the surface power supply after said second predetermined period.

12. A downhole power delivery system according to claim 1 in which the power pick up arrangement comprises a spaced pair of conductive centralisers for making electrical contact with the downhole pipe, and a conductive member provided between the spaced pair of conductive centralisers such that a portion of current flowing in the downhole pipe will flow through the conductive member.

13. A downhole power delivery system according to claim 12 in which the power pick up arrangement comprises a toroidal inductive coupling provided around the conductive member, the toroidal inductive coupling comprising a ring like portion of magnetic material carrying a winding such that current flowing in the conductive member induces a current in the winding, which current is used for powering the downhole device.

14. A downhole power delivery system according to claim 1 in which the power transfer arrangement comprises a spaced pair of conductive centralisers for making electrical contact with the downhole pipe, and a conductive member provided between the spaced pair of conductive centralisers such that a current flowing in the conductive member will cause a current to flow in the downhole pipe.

15. A downhole power delivery system according to claim 14 in which the power transfer arrangement comprises a toroidal inductive coupling provided around the conductive member, the toroidal inductive coupling comprising a ring-shaped portion of magnetic material carrying a winding such that current flowing in the winding induces a current in the conductive member which is applied to the downhole pipe.

16. A downhole power delivery system according to claim 14 in which the downhole power supply apparatus comprises insulation means for insulating the conductive member from the downhole pipe at locations away from the conductive centralisers.

17. A downhole power delivery system according to claim 1 in which said downhole metallic pipe comprises two portions, a first portion on a first side of an axial spacing in the region of the plug and a second portion on a second side of the axial spacing such that there is an uncased length of borehole created by the axial spacing between the two portions in which the material of the plug seals against the formation in which the borehole is drilled, and a break is provided in at least one of the first portion and the second portion of downhole metallic pipe so forming a metallic pipe section which is not galvanically connected to the remainder of the downhole metallic pipe on the respective side of the axial spacing and a respective one of the power transfer arrangement and power pick up arrangement comprises said metallic pipe section as an electrode for applying signals to the formation and/or picking up electrical signals from the formation.

18. A downhole power delivery system according to claim 1 in which the power supply apparatus comprises a battery carrying unit and, separate from the battery carrying unit, a power signal unit and further comprises a cable for supplying power from the battery carrying unit to the power signal unit.

19. The downhole power delivery system of claim 1 in which the downhole power supply apparatus and below plug apparatus are arranged for delivering electrical power from the downhole power supply apparatus to the downhole device across the downhole sealing plug without cables penetrating through the sealing plug.

20. An abandoned well monitoring system comprising a downhole power delivery system according to claim 1, wherein the well is an abandoned well comprising liner and the sealing plug is provided in the liner and the below plug apparatus comprises downhole sensing apparatus.

21. A downhole power delivery method for use in a well comprising downhole metallic pipe running in a borehole of the well with a downhole sealing plug provided in a bore or annulus at least partly defined by the downhole metallic pipe, the method comprising:
positioning a below plug apparatus, including a downhole device requiring electrical power, in the borehole below the plug;

positioning a downhole power supply apparatus in the borehole above the plug, the power supply apparatus comprising at least one battery for powering the downhole device;

delivering electrical power from the downhole power supply apparatus to the downhole device across the downhole sealing plug, wherein the power supply apparatus comprises a power transfer arrangement for applying electrical current to the downhole metallic pipe above the plug and the below plug apparatus comprises a power pick up arrangement for picking up electrical current from the downhole metallic pipe below the plug to power the downhole device.

22. The method of claim 21 comprising delivering electrical power from the downhole power supply apparatus to the downhole device across the downhole sealing plug without cables penetrating through the sealing plug.

23. An abandoned well monitoring system for monitoring an abandoned well installation which comprises a borehole lined with metallic liner and plugged with a downhole sealing plug within the liner, the monitoring system comprising:

a downhole sensing apparatus located in the borehole below the plug for sensing a parameter in the well below the plug; and a downhole power supply apparatus located in the borehole above the plug, the power supply apparatus comprising at least one battery for powering the downhole sensing apparatus, wherein the power supply apparatus comprises a power transfer arrangement for applying electrical current to the liner above the plug; and the downhole sensing apparatus comprises a power pick up arrangement for picking up electrical current from the liner below the plug to power the downhole sensing apparatus, wherein the power supply apparatus comprises a power transfer arrangement for applying electrical current to the downhole metallic pipe above the plug and the below plug apparatus comprises a power pick up arrangement for picking up electrical current from the downhole metallic pipe below the plug to power the downhole device.

24. The abandoned well monitoring system of claim 23 in which the downhole power supply apparatus and below plug apparatus are arranged for delivering electrical power from the downhole power supply apparatus to the downhole device across the downhole sealing plug without cables penetrating through the sealing plug.

25. An abandoned well monitoring method for monitoring an abandoned well installation which comprises a borehole lined with metallic liner and plugged with a downhole sealing plug within the liner, the method comprising:

positioning a downhole sensing apparatus in the borehole below the plug for sensing a parameter in the well below the plug;

positioning a downhole power supply apparatus in the borehole above the plug, the power supply apparatus comprising at least one battery for powering the downhole sensing apparatus;

using the power supply apparatus to apply electrical current to the liner above the plug; and using the downhole sensing apparatus to pick up electrical current from the liner below the plug to power the downhole sensing apparatus, wherein the power supply apparatus comprises a power transfer arrangement for applying electrical current to the downhole metallic pipe above the plug and the below plug apparatus comprises a power pick up arrangement for picking up electrical current from the downhole metallic pipe below the plug to power the downhole device.

26. The method of claim 25 comprising delivering electrical power from the downhole power supply apparatus to the downhole device across the downhole sealing plug without cables penetrating through the sealing plug.

27. A downhole power delivery system for use in a well, the well comprising downhole metallic pipe running in a borehole of the well with a downhole sealing plug provided in a bore or annulus at least partly defined by the downhole metallic pipe, the power delivery system comprising:

a below plug apparatus located in the borehole below the plug, the below plug apparatus including a downhole device requiring electrical power; and a downhole power supply apparatus located in the borehole above the plug, the power supply apparatus comprising at least one battery for powering the downhole device, the downhole power supply apparatus and below plug apparatus being arranged for delivering electrical power from the downhole power supply apparatus to the downhole device across the downhole sealing plug, wherein the power delivery system further comprises:

a surface power supply for supplying power to the below plug apparatus by applying electrical current to the downhole metallic pipe above the plug; and a control means arranged for controlling when the below plug apparatus uses power from the surface power supply and when the below plug apparatus uses power from the downhole power supply apparatus.

28. A downhole power delivery system for use in a well, the well comprising downhole metallic pipe running in a borehole of the well with a downhole sealing plug provided in a bore or annulus at least partly defined by the downhole metallic pipe, the power delivery system comprising:

a below plug apparatus located in the borehole below the plug, the below plug apparatus including a downhole device requiring electrical power; and a downhole power supply apparatus located in the borehole above the plug, the power supply apparatus comprising at least one battery for powering the downhole device, the downhole power supply apparatus and below plug apparatus being arranged for delivering electrical power from the downhole power supply apparatus to the downhole device across the downhole sealing plug, wherein the below plug apparatus comprises at least one local battery, wherein the power delivery system further comprises control means arranged for controlling when the below plug apparatus uses power from the local battery and when the below plug apparatus uses power from the power supply apparatus, and the below plug apparatus is arranged under control of the control means to operate using the local battery whilst the local battery has charge and switch to use power from the power supply apparatus when the local battery does not have charge.

29. A downhole power delivery system for use in a well, the well comprising downhole metallic pipe running in a borehole of the well with a downhole sealing plug provided in a bore or annulus at least partly defined by the downhole metallic pipe, the power delivery system comprising:

a below plug apparatus located in the borehole below the plug, the below plug apparatus including a downhole device requiring electrical power; and a downhole power supply apparatus located in the borehole above the plug, the power supply apparatus comprising at least one battery for powering the downhole device, the downhole power supply apparatus and below plug apparatus being arranged for delivering electrical power from the downhole power supply apparatus to the downhole device across the downhole sealing plug, wherein the below plug apparatus comprises at least one local battery, wherein the power delivery system further comprises a control means arranged for controlling when the below plug apparatus uses power from the local battery and when the below plug apparatus uses power from the power supply apparatus, and the control means are arranged to cause the below plug apparatus to use power from the local battery for a predetermined period after a start time and arranged to cause the below plug apparatus to use power from the power supply apparatus after said predetermined period.

30. A downhole power delivery system for use in a well, the well comprising downhole metallic pipe running in a borehole of the well with a downhole sealing plug provided in a bore or annulus at least partly defined by the downhole metallic pipe, the power delivery system comprising:

a below plug apparatus located in the borehole below the plug, the below plug apparatus including a downhole device requiring electrical power; and a downhole power supply apparatus located in the borehole above the plug, the power supply apparatus comprising at least one battery for powering the downhole device, the downhole power supply apparatus and below plug apparatus being arranged for delivering electrical power from the downhole power supply apparatus to the downhole device across the downhole sealing plug, wherein the below plug apparatus comprises at least one local battery, and wherein the power delivery system further comprises:

a surface power supply for supplying power to the below plug apparatus by applying electrical current to the downhole metallic pipe above the plug; and a control means arranged for controlling when the below plug apparatus uses power from the surface power supply, when the below plug apparatus uses power from the local battery, and when the below plug apparatus uses power from the downhole power supply apparatus.

31. A downhole power delivery system for use in a well, the well comprising downhole metallic pipe running in a borehole of the well with a downhole sealing plug provided in a bore or annulus at least partly defined by the downhole metallic pipe, the power delivery system comprising:

a below plug apparatus located in the borehole below the plug, the below plug apparatus including a downhole device requiring electrical power; and a downhole power supply apparatus located in the borehole above the plug, the power supply apparatus comprising at least one battery for powering the downhole device, the downhole power supply apparatus and below plug apparatus being arranged for delivering electrical power from the downhole power supply apparatus to the downhole device across the downhole sealing plug, wherein the power supply apparatus comprises a power transfer arrangement for applying electrical current to the downhole metallic pipe above the plug and the below plug apparatus comprises a power pick up arrangement for picking up electrical current from the downhole metallic pipe below the plug to power the downhole device, and there is an axial spacing between two lengths of downhole metallic pipe in the region of the plug such that there is an uncased length of borehole in which the material of the plug seals against the formation in which the borehole is drilled, and a break is provided in the downhole metallic pipe on at least one side of the axial spacing so forming a metallic pipe section which is not galvanically connected to the remainder of the downhole metallic pipe on the respective side of the axial spacing and a respective one of the power transfer arrangement and power pick up arrangement comprises said metallic pipe section as an electrode for applying signals to the formation and/or picking up electrical signals from the formation.

\* \* \* \* \*